Oct. 6, 1953   A. M. FELLER   2,654,858
APPARATUS FOR THE INTEGRATION AND CONTROL OF
RADIATION, PARTICULARLY FOR THE CONTROL
OF EXPOSURE IN PHOTOGRAPHIC PROCESSES
Filed Feb. 23, 1949   5 Sheets-Sheet 1
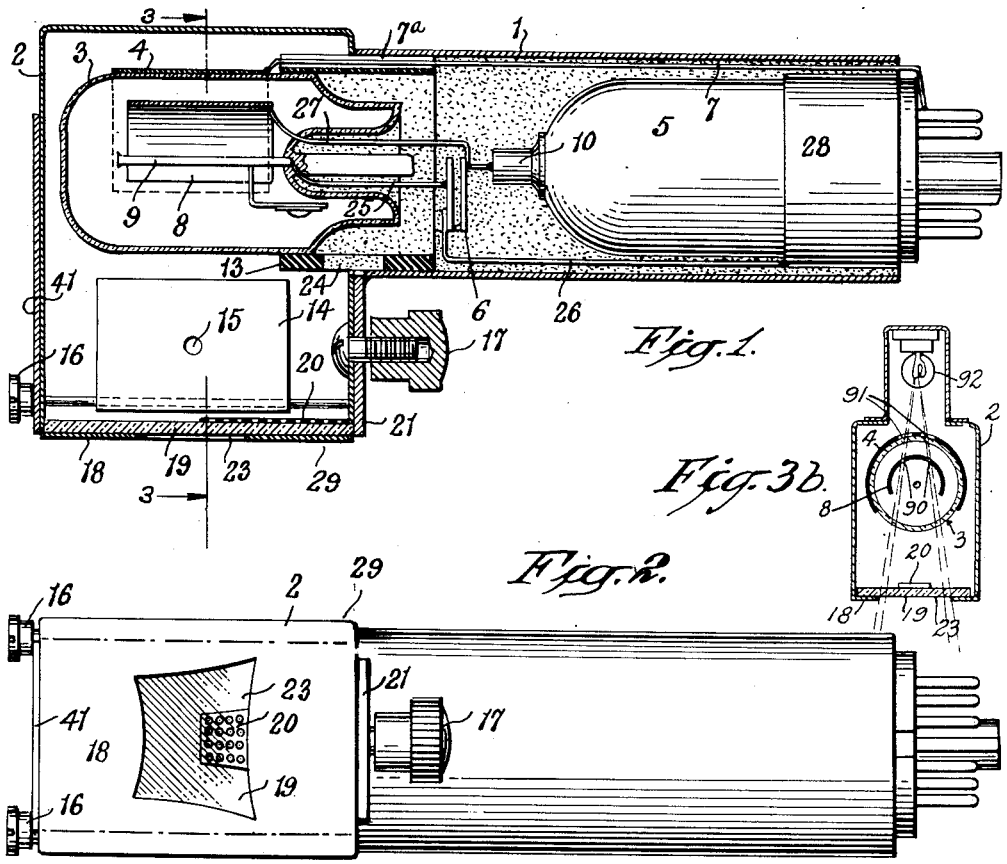
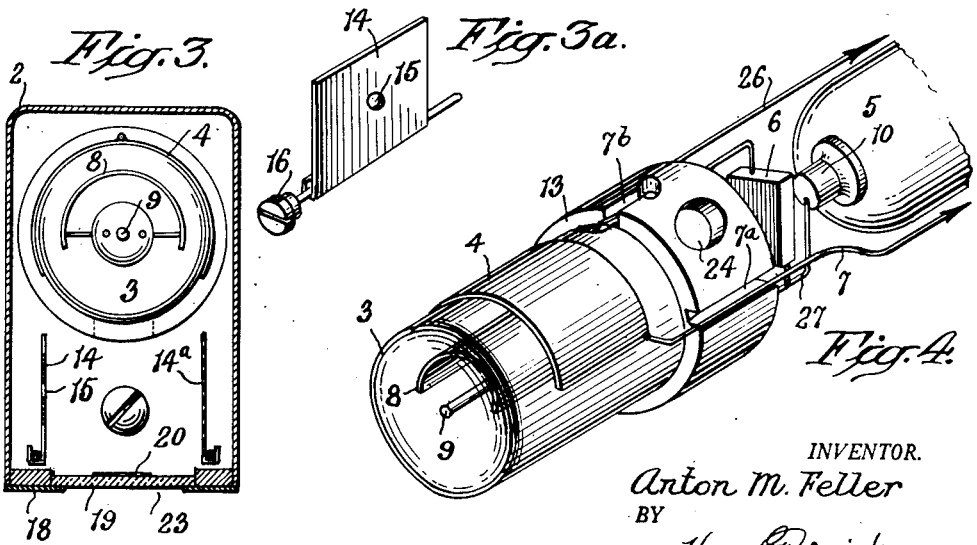
INVENTOR.
Anton M. Feller
BY
Harry Radzinsky
ATTORNEY

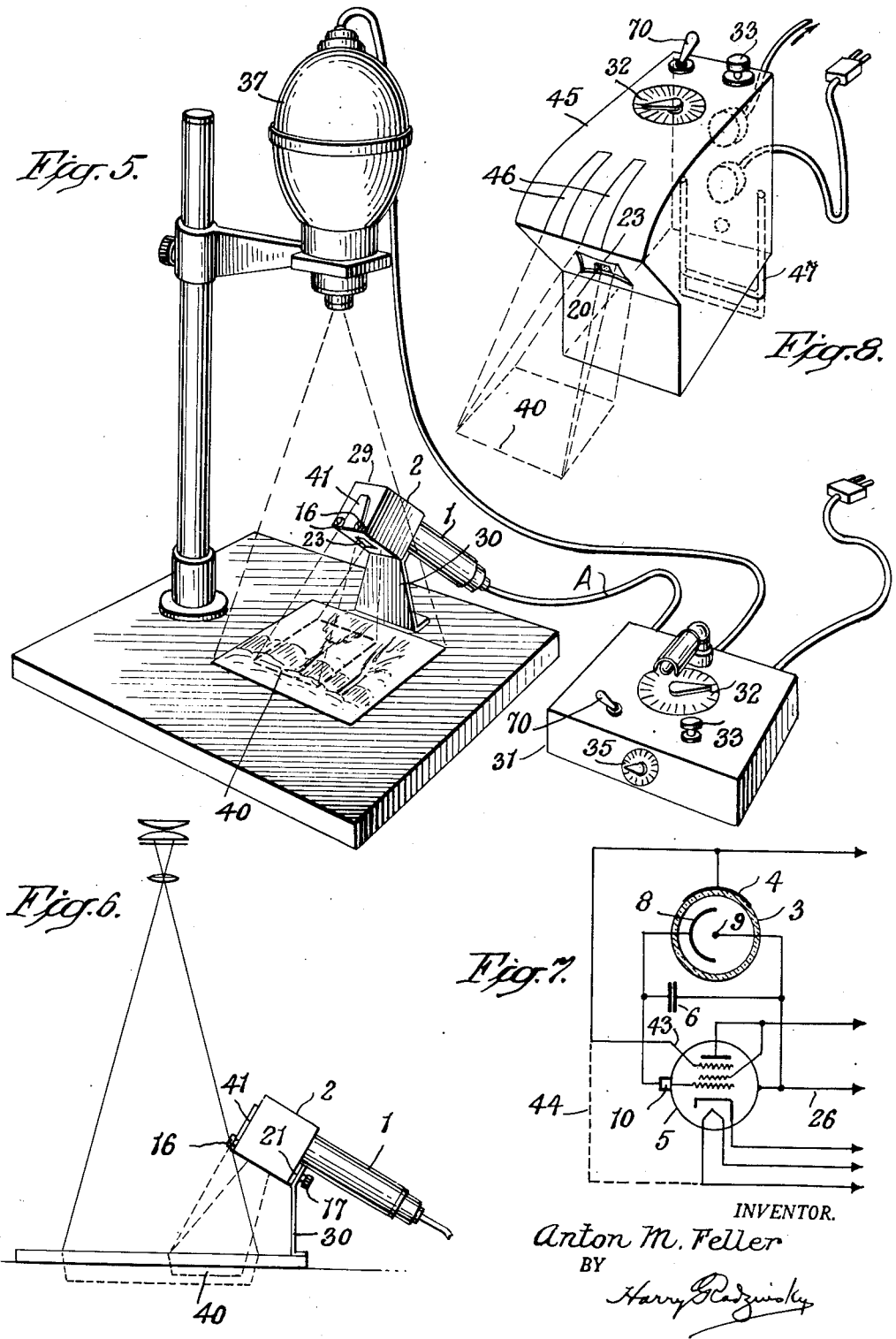

INVENTOR.
Anton M. Feller
BY
Harry Radzinsky
ATTORNEY

Oct. 6, 1953

A. M. FELLER 2,654,858

APPARATUS FOR THE INTEGRATION AND CONTROL OF
RADIATION, PARTICULARLY FOR THE CONTROL
OF EXPOSURE IN PHOTOGRAPHIC PROCESSES

Filed Feb. 23, 1949

INVENTOR.
Anton M. Feller
BY
Harry Radzinsky
ATTORNEY

Patented Oct. 6, 1953

2,654,858

UNITED STATES PATENT OFFICE 2,654,858

APPARATUS FOR THE INTEGRATION AND CONTROL OF RADIATION, PARTICULARLY FOR THE CONTROL OF EXPOSURE IN PHOTOGRAPHIC PROCESSES

Anton Martin Feller, Elizabeth, N. J.

Application February 23, 1949, Serial No. 77,768

9 Claims. (Cl. 317—128)

This invention relates to improvements in electrical systems adapted for the automatic integration of radiation and specifically to such applications of apparatus of this type where a time function, derived from the integration is utilized to automatically terminate radiation after a desired total amount of radiation has been dispensed.

One of the special aims of this invention is the control of the duration of a process where the total amount of radiation to be controlled may be a linear, exponential or other time function.

One application of this invention applies to the automatic control of exposure in photographic processes.

In disclosing the principles of this invention, particularly in relation to the prior art, I shall first described one specific application, namely, the control of exposure in photographic enlarging. Other applications will become apparent from this description and from the appended claims.

It is a well known that that the latitude of photographic papers used for enlarging is considerably narrower than that of corresponding negative materials. The time of exposure in photographic enlarging must, therefore, be closely controlled.

The prior art has disclosed the use of the discharge of an electrical condenser through a phototube as a means to achieve fully automatic control, as is disclosed, for example, in Patent No. 1,939,243 issued to F. Twyman.

The cited patent also takes into consideration the fact that in apparatus of this type the influence of even minute leakage currents, has an extremely adverse effect upon the resulting linearity and moreover that, according to investigations by Schwarzschild and others, the exposure should be dispensed according to an exponential ratio instead of a linear one.

Since even the most careful selection of circuit elements, the use of the best insulating materials, reduction of filament temperature, the use of guard rings and shields, the exclusion of atmospheric humidity and other precautions fail to produce true linearity for long exposures, not to speak of the above-mentioned required exponential relationship, the patentee of Patent No. 1,939,243 proposes to introduce a "counter-leakage" by means of a second phototube.

While this will achieve a certain amount of correction, it is creative of a considerable complication and subject to its own leakage problems.

The present invention takes into consideration the fact that an external metal foil or a conductive semi-liquid coating applied to the lime-glass shell of a conventional phototube may be used like an internal electrode and may therefore be utilized to introduce "counterleakage" currents.

Furthermore, the potential applied to this external electrode may be derived from a condenser that is charged or discharged through a high resistance or from a network of a plurality of condensers and resistors, which, as well known in this art, may produce a voltage increasing or decreasing according to almost any desired linear or non-linear time function. The change in voltage may also be derived by various other means such as rotating potentiometers, thermosensitive resistors, and other devices sensitive to radiation, magnetic or electrostatic fields.

Conduction from the external foil on the glass bulb of the phototube to the normal internal electrodes of the tube is partly photo-electric and partly resistive. The general effect of it may be stated as equivalent to an internal electrode in series with a high resistance and shunted by a high resistance. I have also observed that the spectral sensitivity of the phototube appears to be shifted toward shorter wavelengths by the externally applied potential. I can utilize this latter fact for the "color correction" of a given phototube. This effect has been observed with "blue sensitive" as well as "red sensitive" tubes of the vacuum or gas type.

For the purpose of achieving superior insulation, I assemble the "search unit" formed of the phototube with external electrode, a small capacitor which is used to supply the time function and an input high impedance amplifying tube, as a compact unit, cast into a solid block of ceresin which is a form of paraffin wax. The external electrode is used as a compensating device to introduce "counterleakage" currents and is not employed as a conventional shield as it might appear at a first glance. In order to keep the operating temperature low, the filament current of the amplifier input tube is greatly reduced. The plate voltage is limited to about 15 volts and is completely removed after the termination of each exposure, thus greatly extending the useful life of this unit and also preventing erratic oscillations.

It is an object of this invention to utilize the light reflected from a given area of sensitized paper. Since in this manner a constant portion of the radiant energy reflected by a unit area of the projected image is used for control purposes, any variation due to changes in the scale of magnification or due to so-called "dodging" is automatically accounted for.

The full angle of acceptance of the receiving search unit must be within the area of the projected image, but the projected image may be considerably larger than that if the light is fairly evenly distributed. In order to meet this requirement, I have provided a metal plate on the search unit to indicate the angle of acceptance, so that this unit may be placed correctly. Another method of indicating the sensitive area such as by means of projected spots or red light, by an area of red light or by a hinged wire frame will be discussed later.

It is understood that in a simple optical system of the type represented by this search unit, the effects of light from the various portions of the projected image are not uniform. The center portions and sections of the image nearer to the phototube will have a greater influence than the areas near the borderline of the sensitive area of the search unit. How the influence has been approximately equalized will be apparent from the detailed description.

An electrical amplifying circuit of the type required by this invention is subject to surges and oscillations. Various means can be devised to stabilize such a circuit and are well known to the art. Locking relays may be employed. A special method is incorporated in the appended diagram, but I do not propose to limit myself to this particular arrangement of stabilizing elements.

With suitable modifications and additions, some of which are shown in the drawings, the device may also be employed as an auxiliary feature for the measurement of contrast and for densito-metric measurements.

The inventive idea involved is capable of receiving a variety of expressions, some of which, for purposes of illustration, are shown in the accompanying drawings, but it is expressly understood that said drawings are employed merely to facilitate the description of the invention as a whole and not to define the limits thereof, reference being made to the appended claims for this purpose.

In the drawings, wherein an illustrative embodiment of the invention is shown,

Fig. 1 is a longitudinal section of an assembly, consisting of a phototube, a vacuum tube preamplifier, and a condenser in coupled relation. This unit is hereafter referred to as the "search unit."

Fig. 2 is a bottom view of the search unit.

Fig. 3 is a cross section of the receiving end of the search unit, taken along the line 3—3 of Fig. 1, looking in the direction of the arrows.

Fig. 3a is an isometric view showing one of the hinged controlling flaps.

Fig. 3b is a sectional view showing means for indicating the sensitive area by projected spots of light or by a projected cone of light.

Fig. 4 is an isometric view showing the arrangement and the interconnecting wiring of the functional elements of the search unit.

Fig. 5 is a perspective view showing how the search unit of Fig. 1 is used in conjunction with a coordinated amplifier and relay, and how these units are set up with a conventional enlarger and a suitable support.

Fig. 6 is a diagrammatic view showing the coordination of the image projected by the enlarger with the area of sensitivity to which the search unit responds.

Fig. 7 is a circuit diagram showing the wiring of the circuit elements incorporated in the search unit.

Fig. 8 shows a modified construction, consisting of a compact combination of the elements of the search unit with the coordinated control units, which are shown in Fig. 5 as being enclosed in a separate casing.

Fig. 12 is a graphic representation of the relationship between exposure time and light intensity for different values of Schwarzschild's constant and of the actual performance obtained with an instrument designed according to the disclosed inventive ideas.

Figure 9:
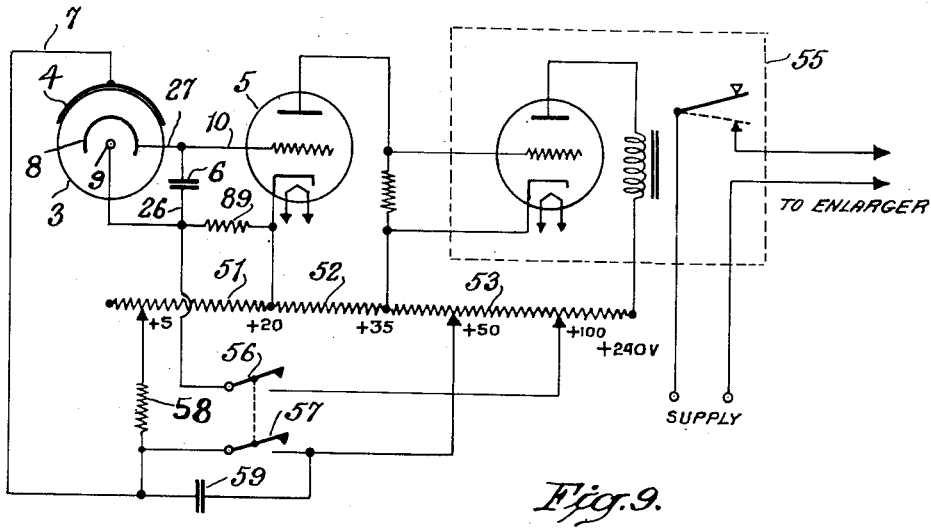
Fig. 9 shows a simplified circuit diagram to facilitate discussion of the function of the various control elements.

It has been stated initially that a unit suitable for the accurate control of radiation must possess extremely high input impedance, that is, low leakage. Furthermore, according to the principles disclosed by this invention, the irreducible leakage should be compensated for by a counter-leakage.

A basic unit capable of responding to visible or invisible radiation is shown in Figures 1 to 4 inclusive. Therein a suitable housing of metal, which may consist conveniently of a tubular part 1 and a rectangular section 2, contains a phototube 3, a conventional radio receiving tube, preferably a pentode 5, and a small mica-condenser 6. A part of the external surface of the phototube 3, which is preferably of the vacuum type, is coated with a metal foil 4. As stated initially, it is conduction from this external foil 4 to the electrodes 8 and 9 of the phototube 3 which counteracts the undesirable effects of leakage. In order to secure good conduction I prefer to apply the foil to the envelope of the phototube 3 with cement of the fish-glue type to which a few drops of glycerol have been added. Since the currents to be transmitted are minute, the metal foil itself might be omitted and the semi-liquid layer of the cement itself may be used as a conductor.

The lower part of the housing 2 is closed with a glass face-plate 19 and an outer metal plate 18 which has an opening or window 23. It is the function of this opening 23 to limit the area of the radiation to be admitted to the phototube. Part of the opening 23 is covered with a perforated or semi-opaque screen 20, the function of which is to effectually equalize the effects of radiation falling through the opening 23 upon the photosensitive cathode 8 of the phototube. To the housing 2 may be added a screw with a knurled knob 17 for attaching the unit to a suitable support.

It may be found desirable to provide one or two pivoted flaps 14, 14a, the positions of which may be adjusted either parallel to or at right angles with the face-plate 18 by means of the knobs 16 located outside of the housing 2. One of the flaps 14a may consist of foraminous metal or translucent material, while the other flap 14 may have a small circular opening 15 in its center.

The function of the foraminous or translucent flap 14a is to reduce the amount of radiation allowed to enter, by a given percentage, thus extending the range of the instrument, while the circular hole 15 in the flap 14 may be used to adapt the instrument for spot-photometric measurements, a feature which is of an auxiliary nature.

The front or forward end of the housing 2 is provided with a metal plate 41 (Fig. 13) or corresponding engraved lines. The purpose of this plate 41 is to indicate visually, by approximate guide lines, the angle of acceptance of this device. The significance of this arrangement is illustrated by the Figures 5, 6, and 13.

The conventional radio-receiving tube 5 has a metal base ring 28 which is inserted into the tubular housing 1, some insulating wrapping interposed between the ring 28 and the housing 1 to thereby electrically insulate the ring 28 from the housing 1. Conventionally, the base ring 28 is connected to one of the base pins of the tube for purposes of shielding. In carrying out the present invention this ring 28 is utilized to introduce charging potentials to the condenser 6 by means of the lead 26 which extends to the condenser 6 from the ring 28 as seen in Fig. 1.

Through the annular space between the ring 28 and the housing 2 is also located an insulated lead 7 extending from another base pin of the tube 5 to the metal foil 4 or its equivalent coating.

The lead 27, establishes electrical connection between the photosensitive cathode 8 and one side of the condenser 6 as well as to the grid cap of tube 5. It is this connection which requires the highest possible value of insulation, which should be of the order of about 200,000 megohms. To achieve this insulation value the lead 27 is made as short as possible, self-supporting, and without intermediate connection to an auxiliary switch. In order to be able to charge the condenser 6 to a potential negative on the grid side of the tube 5, the opposite side of the condenser is temporarily connected to a positive potential. This will charge the condenser negatively on the grid side through grid rectification.

For convenient assembly the phototube 3 is inserted into a split collar 13, made of insulating material. The slot 7a of the collar 13 is used to introduce a compensating potential to the foil or coating 4 by means of the lead 7, while the partial slot 7b of the collar 13 serves to bring a lead 25 from the anode 9 of the phototube, and a lead 26 from the ring 28 and the positive side of the condenser 6 through the housing 1 for interconnection after completed assembly. It would otherwise be very difficult to complete the wiring in the confined space.

In order to exclude atmospheric humidity, the remaining internal space of the housing 1 is completely filled with ceresin, ozokerite, or similar substance of superior insulating value. The material "ozokerite" is a form of paraffin wax. For this purpose the molten material is introduced through a hole 24 in the collar 13. The position of this hole 24 on the circumference of the collar 13 is immaterial and for clearness' sake Fig. 4 shows the hole 24 in a different relative position from Fig. 1.

As one arbitrary method of attaching the tubular part 1 to the rectangular section 2, a plate 21 is brazed or soldered to the tube 1. This permits fastening of the tube 1 to the section 2 by means of the screw with knurled knob 17, which in addition serves for attachment to a support. Obviously, other means of mechanical assembly might be substituted. The manner in which the parts of the search unit are assembled and joined by wiring as above described is, to a substantial extent, determined by the shape and size of such elements and in the particular arrangement shown in Fig. 4, presently-available commercial tubes are utilized. It will be apparent however, that by the utilization of specially-designed parts the arrangement of such parts as well as the general design of the unit as a whole may be varied considerably.

The electrcial connections used in the search unit are shown in a more complete manner in Fig. 7. It will be seen therein that for purposes of introducing the compensating potential to the foil 4, I utilize the base pin of the tube 5 which normally leads to the so-called suppressor 43. This not only reduces the number of leads in the cable A shown in Fig. 5 and connecting the search unit generally designated as 29, with the control box 31, but I have found that the simultaneous connection of the compensating potential to the suppressor helps to increase the effect of compensation. Similarly I may also connect one side of the filament circuit to the compensating circuit, as shown by the dotted line 44 in Fig. 7. I may, however, prefer to make an independent connection to the compensting foil 4, instead of the combined connection shown.

Figure 10:
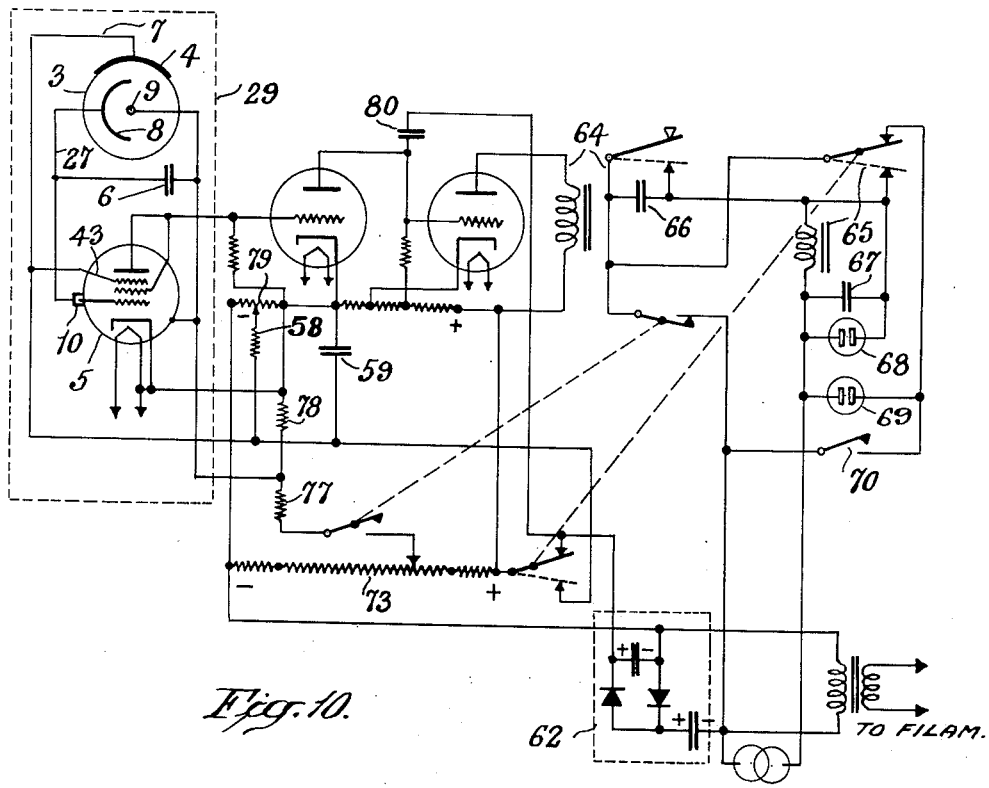
Fig. 10 is a complete diagram of an assembly of circuit elements suitable for operation on alternating current.
Figure 11:
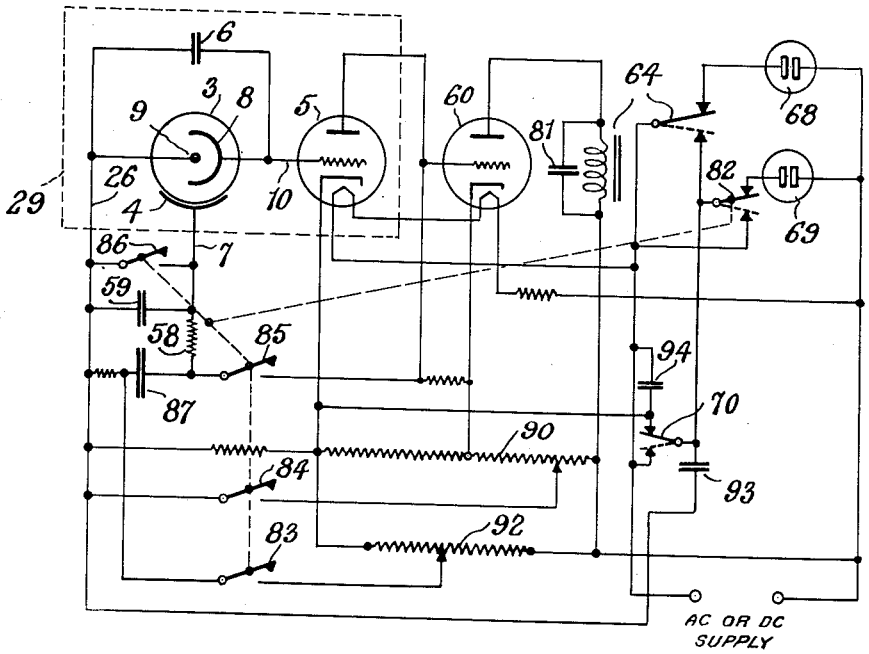
Fig. 11 is a diagram showing an alternate system of circuit elements which may be operated on direct or alternating current.

In order to make practical use of the search unit just described it must be connected to an amplifier and relay circuit. A number of such circuits are shown in Figures 9, 10 and 11, and it will be evident to those skilled in the art that many additional variations of circuit elements may be devised which might be equally well or even better suited for given conditions.

The circuit of Fig. 9 has been simplified to essential elements in order to facilitate the discussion of the various control functions. With reference to Fig. 9 the tube 5, the phototube 3 with external foil 4, and the condenser 6 form the main elements of the search unit discussed previously.

A voltage divider is formed of the potentiometer 51, the resistor 52, and the potentiometer 53. From a suitable supply a voltage of about 240 volts is impressed upon this circuit, producing at intermediate points the voltages stated in the figure.

The output of the tube 5 is used as the input to a conventional amplifier, which in turn operates a relay. This unit 55 is shown as a rectangle composed of dotted lines. A manually operated push-button includes and controls the switches 56 and 57, which are shown in the normal position. Depressing the button will temporarily connect the condenser 6 to a positive potential of 100 volts and the condenser 59 is charged positively to 50 volts.

After release of the button and resultant change of position of the switches 56 and 57, the condenser 6 will, on account of grid rectification, appear charged negatively on the side of the grid 10, that is, in relation to the cathode of tube 5, to which the condenser is linked by the resistor 89. On account of the relatively high negative charge the tube 5 becomes non-conductive and, since the input impedance of the tube 5 is extremely high, the charge of the condenser 6 will tend to leak off, chiefly through the phototube 3.

The positive charge of the condenser 59 will be impressed upon the compensating foil 4. The condenser 59 will, however, receive a steady influx of negative electricity through the resistor 58 of about five megohms. The originally positive charge of this condenser will, therefore, slowly disappear and be replaced by a negative charge. Since the capacity of the condenser 59 is about 1 microfarad, it will require considerable time to complete the reversal of the potential. During this period the search unit is exposed to the influence of radiation.

If the amount of radiation present is large, the condenser 6, of say 50 micromicrofarads, will be quickly discharged and the compensating foil 4, which initially is positive, will contribute to the speed of the discharge. On the other hand, if the radiation falling upon the phototube 3 is of low intensity the discharge of the condenser 6 will proceed slowly and during this time the foil 4 will assume an increasingly negative charge, which in turn still further slows the speed of the discharge. It is apparent that the influence of the compensating device, as represented by the foil 4, may be conveniently varied by adjusting the potentiometer 51, whereas the charge of the timing condenser 6 may be varied at will within certain limits by adjusting the potentiometer 53. The coordinated amplifier 55, which may consist of one or more stages, acts upon a relay, which in turn controls the radiation.

Fig. 10 shows an extension of the basic circuit of Fig. 9 suitable for operation on alternating current. Direct current for operation of the amplifier, the timing circuit, and the compensating circuit, is obtained from a voltage doubler 62. Adjustment of the timing potential is secured through the potentiometer 73 and of the compensating potential through the potentiometer 79. The time potential may also be attenuated by the resistors 77 and 78.

Amplifiers of high input impedance show a tendency to oscillate, and a special double relay circuit has been incorporated to prevent a spontaneous recurrence of exposures. The locking circuit provided by a sensitive D. C. relay 64 and an alternating current relay 65 also has the function of disconnecting, after completed exposure, the plate supply from the search unit and from the amplifier, and thus considerably extends the useful life of these units. The condensers 66, 67 and 80 have been added for the suppression of transients.

One of the objects of this circuit is to automatically disconnect all or a part of the usual dark-room illumination during the exposure of the photographic material. Even if the cathode material of the phototube 3 is of the blue-sensitive type there still remains a small amount of response to the typical red illumination of the dark-room which has a deteriorating effect upon the desired time functions. A special socket 68 has therefore been provided for connecting the dark-room illumination and/or a desirable pilot light, while the enlarger itself is plugged into the socket 69. While socket 69 is "on" socket 68 is "off." The enlarger may also be turned on manually for focusing purposes by means of the switch 70. Switches shown connected by dotted lines are linked mechanically.

A simpler circuit for operation on direct or alternating current is shown in Fig. 11. If operated on direct current, this circuit functions in a manner similar to the circuit shown in Fig. 10. No rectifier has been provided for operation on alternating current; the two stage amplifier acting as a direct-coupled A. C. operated amplifier, and the coil of the sensitive relay 64 cannot be energized once the armature of this relay has been released, except by manually closing the push-button contacts 82. This provides definite locking.

For charging the compensating condenser 59 an alternate system has been incorporated. The push-button is supplied with five make contacts and one break contact, designated respectively at 82, 83, 84, 85 and 86.

Momentary operation of the push-button will simultaneously accomplish the following:

(1) The enlarger receptacle 69 will be temporarily disconnected from the supply circuit through contacts 82, while the amplifier and relay circuit will be connected through the same contacts, causing the relay armature to pull up.

(2) Closure of contact 84 will cause the timing condenser 6 to be charged to a potential determined by the position of the potentiometer 90.

(3) Any remaining charge on the compensating condenser 59 is discharged by closing contacts 86.

(4) The large condenser 87 of about one microfarad is charged to a potential given by the potentiometer 92 by closing the contacts 83 and 85, through grid rectification at the grid of tube 60.

After release of the push-button the charge of the condenser 87 will leak off through the resistor 58 into the compensating condenser 59, causing an increasingly negative voltage to be impressed upon the compensating foil 4. The relay 64 will remain energized until the negative charge of condenser 6 has leaked off through the phototube 3. As soon as the tube 5 begins to conduct, the tube 60 will stop conduction, causing the relay 64 to drop out, thus ending the exposure.

The condensers 93 and 94 help to suppress transients, while the condenser 81 minimizes chatter of the relay 64. As in Fig. 10, the receptacle 69 is provided for connection to the enlarger and the receptacle 68 is for the dark-room illumination and/or a pilot light. The switch 70 is provided for manual focusing.

Because of the lower voltages available in the circuit of Fig. 11 the time range of this circuit is limited.

Since in the circuit of Fig. 11 the compensating condenser 59 is charged through the resistor 58 from the condenser 87, the charge of which is thereby simultaneously decreasing, it is apparent that the time function of the voltage impressed upon the compensating foil 4 is different from the ratio inherent in the circuit of Figures 9 and 10. For purposes of extending the time range of this instrument one may take advantage of the hinged screen 14a attached to the search unit, as shown in Figure 3 and previously described.

It will be apparent to those skilled in the art that a unit according to Figs. 9, 10, or 11 may be easily modified to produce an output proportional to the amount of radiation falling upon the search unit and may thus be utilized for spot-photometric measurements of contrast, by means of a small diaphragm as exemplified by the hole 15 in the flap 14 of Figures 1 and 3. Such an arrangement is, however, of an auxiliary nature and has been omitted from the diagrams for the sake of clearness.

In all of the circuits described above, the time ratio of the resulting exposure may be varied by adjusting the compensating potentiometer. Additional variations of the time ratio may be obtained by providing other networks of condensers and resistors in the compensating circuit such as will readily suggest themselves to an experienced designer.

Fig. 12 shows the relationship between light intensity and exposure time for various adjustments of the compensating elements according to Fig. 10. The graphs B, D, and F show the calculated theoretical values for various Schwarzschild constants as indicated.

The curve A shows the performance of an instrument, the components of which have been carefully selected for low leakage, but with the compensating feature disconnected from the circuit. C, E, and G show arbitrary, actual approximations to various Schwarzschild constants. The graph H indicates a performance considerably in excess of theoretical requirements.

It is pointed out that the effect of existing dark-room illumination or of light leaking through the optical system of the enlarger acts similarly as electrical leakage within the search unit. If the instrument is adjusted to a performance similar to graph H it will, therefore, in the presence of extraneous residual illumination, give, in effect, a ratio corresponding to a curve between any of the graphs G, E, C, and A, depending on the magnitude of the extraneous illumination. The wide range of adjustment may also be useful in cases of applications where the control of radiation should be governed by principles different from those applying to photographic emulsions, as for instance the therapeutic application of X-rays.

Practical operation of the device, as illustrated for photographic enlarging in Fig. 5 is as follows:

The search unit 29 is set up so that the head of the search unit casts no shadow on the photographic image and that the sensitive area as indicated by supplied instructions and as defined by the metal plate 41 or corresponding indicating lines falls within the image. The dial 32 on the control box 31 is set to indicate the proper emulsion speed, while the dial 35 generally remains adjusted to the Schwarzschild ratio previously found best suited for the work. As the button 33 is pressed and released the enlarger 37 will be illuminated and stay lighted until the proper amount of light necessary to produce a full tone scale has been dispensed to the photographic emulsion, whereupon the current to the enlarger will be shut off. The instrument is then ready for a repetition of exposure with the same or a different negative without additional adjustment.

Several alternatives may be provided for indication of the sensitive area. One of the arrangements is shown in Fig. 3b. Therein the cathode 8 of the phototube 3 may be perforated with four small holes 90, and the metal foil 4 may be provided with corresponding, but larger, holes as shown at 91. A small red light bulb 92 may be attached to a rearward extension of section 2 of the housing, thus projecting four spots of red light upon the photographic image and thereby indicating the limits of the sensitive area. Or the housing 2 may contain a small red bulb causing a divergent beam of red light to emanate from the opening 23.

Still another way consists of the provision of a hinged wire frame attached to the support 30 in Fig. 5 in such a way that it may, prior to the exposure, be raised to project a rectangular shadow while focusing, but so that it may be swung out of the way during the exposure.

The support 30 may in itself find a variety of expressions. It may, for instance, be attached to an easel, or the search unit may be fastened near the lens of the enlarger pointing downward.

Figure 13:
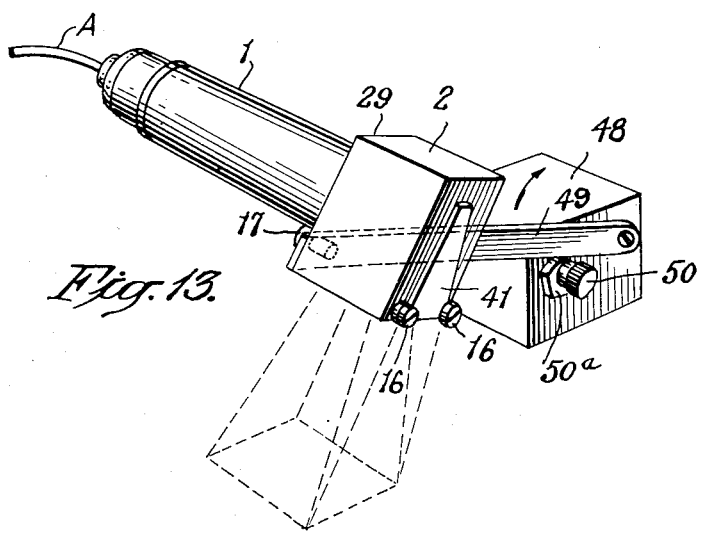
Fig. 13 shows the search unit in combination with an alternate form of adjustable support.
Figure 16:
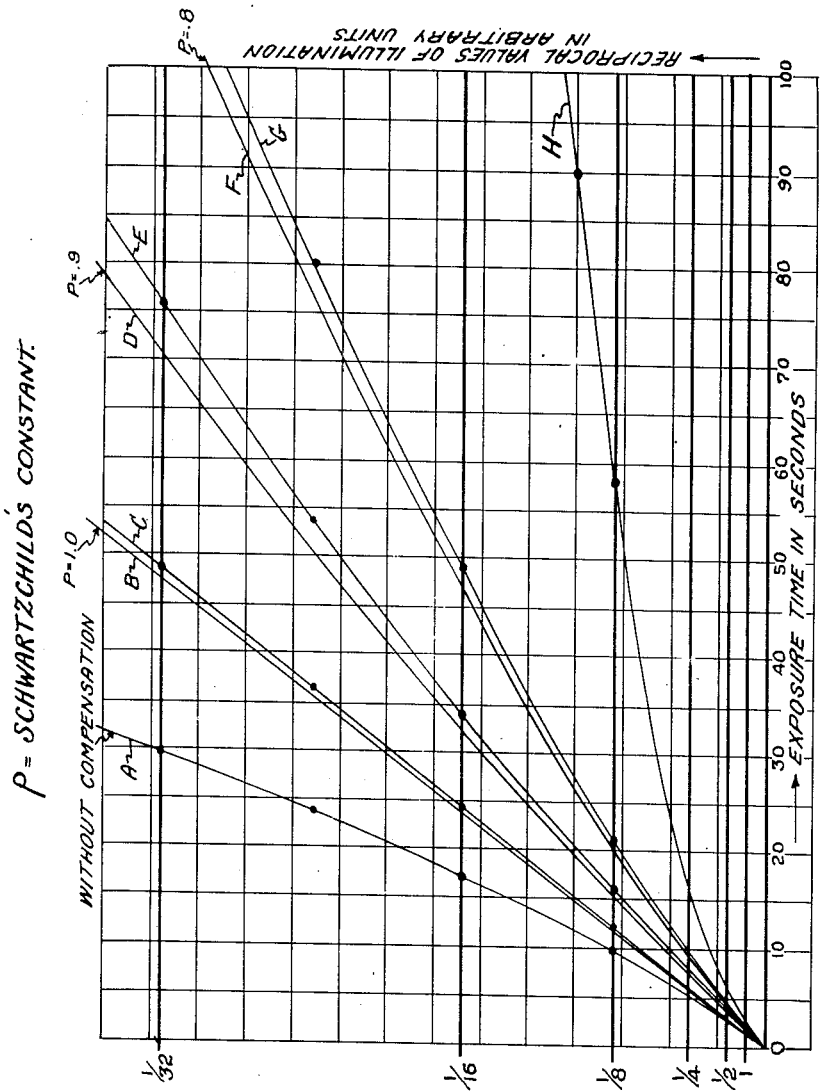

An adjustable support is shown in Fig. 13. Therein a heavy base, or block 48, carries a pivoted lever 49, the angular position of which is adjustable by means of a notched or cam plate 50a attached to the knob 50.

In this structure the search unit 29 is held in a position parallel to the plane of the enlargement. This arrangement requires that the opening 23 of the search unit be oriented along an axis rotated 90 degrees from the one shown in Fig. 2.

A more far-reaching variation is indicated in Fig. 8. Here all the essential elements are combined in one compact housing 45. The lines 46 are not only decorative but constitute guide lines which help to identify the sensitive area 43. The whole housing 45 may be suitably tilted by pulling out the adjustable wire loop 47 to enable it to form a support or rest for the rear of the housing. The ratio dial 35 of Fig. 8 may be located wherever desired on the housing 45 or it may be concealed in a protected position in the interior of the housing.

As stated initially, the inventive idea is capable of finding a variety of expressions other than the field of photographic enlarging, and it is obvious that the instrument in its various forms is suited for the general control of exposure, including that of negative material, or for purposes of contact printing.

For the latter purpose the search unit 29 is fastened to the suitably modified cover of a conventional contact printer. With such an arrangement the light to be controlled will fall through the negative and pass through the photographic printing paper into the search unit. The paper, depending on its thickness, will absorb a fixed percentage of the light transmitted, a fact which can be fully accounted for by a proper adjustment of the time dial (32 in Fig. 5).

A still different application is concerned with the dispensation of X-rays for photographic or therapeutic purposes. For such use the opening 23 of the search unit in Figs. 1 and 2 is closed with a material opaque to visible radiation but transparent to X-rays. The back of the closure and the interior of the housing 1 in Figs. 1, 2 and 3 would be painted with a fluorescent coating, such as zinc sulphide. Roentgen rays entering the housing will thus generate a proportionate amount of visible radiation, which may be utilized for the control in a similar manner as described for photographic enlarging. Similarly the device may be modified for the control of infra-red or other radiation.

If, in the circuit of Fig. 10, a motor-driven electro-mechanical counter is plugged into the receptacle 69 the instrument becomes suitable for the integrated measurement of radiation. Each time the push-button contacts 75 and 76 are depressed the counter will begin to run for a length of time dependent on the setting of the potentiometer 73 and inversely proportioned to the amount of radiation present.

As a still further modification the motor-driven counter may be provided with contacts or connected with relays in such a manner that at the end of each run corresponding to one exposure an operation corresponding to the depression of the contacts 75 and 76 will result, thus causing an automatic and continuous repetition of exposures. The number of runs may be recorded by a second electro-mechanical counter. In this way the instrument will integrate continuously over a long period of time, which may be hours, days, or weeks, the total amount of a given radiation. For instance the total amount of sunlight reaching a given locality in a given period may be recorded by the instrument.

As a convenience to the photographer, who usually works with papers of different contrast and emulsion speeds, one may provide a plurality of time dials 32 and coordinated push-buttons 33 shown in Fig. 5. Operation by a foot switch may be incorporated.

The method of directing radiation to the phototube may, if desired, be modified by means of prisms and lenses.

For special types of negatives with extremely uneven distribution of light and dark areas it may be desirable to have a special plus-minus switch in addition to the regular push-button. This switch may be so arranged as to cause the resulting exposure to be a certain percentage longer or shorter than the standard exposure time for a given emulsion. This may easily be accomplished by changing fixed sections of the time potentiometer.

What I claim is:

1. An improved apparatus for the automatic control of radiation, whereby said control is adapted to terminate the radiation according to a desired exponential time function, which comprises in combination a phototube conductively coupled to a timing condenser and to at least one rate compensating condenser, a conductive foil applied to the exterior of said phototube and connected to at least one of the rate compensating condensers, at least one controllable source of potential for charging said condensers, an electronic amplifier connected to one terminal of said timing condenser and to a relay circuit and at least one relay circuit connected thereto and comprising a relay coil and a relay armature and responsive to the discharge of said timing condenser, whereby the time of discharge of the said timing condenser previously charged to a controllable potential is made a desired function of the amount of radiation impressed upon said phototube by means of the application of said conductive foil to the exterior of said phototube, said foil being connected to independently adjustable sources of variable potential and adapted to cause a small amount of auxiliary variable current flow through the glass envelope of the phototube, whereby the discharge rate of the system is controllably altered, said control being accomplished by a rate variation of the potential applied to the exterior foil on said phototube.

2. In the apparatus for the control of radiation according to claim 1, means comprising the application of external compensating foil upon which a variable potential is impressed, said means being thereby adapted for making said control suitable for the termination of radiation according to a desired time function, such as demanded by Schwarzschild's equation, said equation being:

$$D = \log I.tp - i$$

where:
$D$ = log opacity = density
$I$ = intensity
$t$ = time of exposure
$p$ = Schwarzschild's constant
$i$ = inertia = constant and where $p$ may vary from unity to 0.7.

3. In the apparatus according to claim 1 including the provision of automatic switching means for disconnecting plate voltage from at least one stage of said amplifier after completion of each discharge cycle in order to extend the useful life of the electronic units of the circuit and also to make the combination immune to the influence of voltage surges and transients during the "off" period, said automatic switching means comprising a "holding" circuit whereby the relay coil remains energized after each initial "pull-up" of the relay armature regardless of the conditions existing in the output stage of the amplifier, said relay circuit further comprising relay contacts for keeping the coil energized after each pull-up, and further comprising a switch for opening the locking circuit for starting a new cycle.

4. In the apparatus of claim 1 means for indicating visually the area within which the device is responsive to radiation, said means being provided by guide-lines on parts of the housing of said apparatus and pointing to the limiting corners of a substantially rectangular, pyramidal volume within which the unit is sensitive to radiation.

5. The apparatus of claim 1, including means for indicating visually the area within which said apparatus is responsive to radiation comprising the provision of a window interposed between the phototube and the image, the outline of said window being adapted to cause the definition of a substantially rectangular projected area of sensitivity.

6. The apparatus of claim 5 wherein said means for indicating visually the area within which said apparatus is responsive to radiation comprise the provision of a light source in the vicinity of the phototube, said light source being so arranged as to cause the emersion of a cone or pyramid of colored light, said volume of projected light essentially delimiting the outline of the space angle within which the apparatus is sensitive to radiation.

7. In the apparatus of claim 1, a window of locally variegated transmission placed in front of said phototube, said window being adapted to substantially equalize the response of said phototube to the intensity of radiation within the area of sensitivity of the apparatus, said local transmission of said window being approximately inversely proportional to the effect of radiation in the coordinated field of sensitivity.

8. An improved apparatus for the control of radiation, whereby said control is adapted to terminate the radiation according to a desired exponential time function, which comprises in combination a phototube conductively coupled to a timing condenser and to at least one rate compensating condenser, a conductive foil applied to the exterior of said phototube and connected to at least one rate compensating condenser, at least one controllable source of potential for charging said condensers, an electronic relay circuit coupling the timing condenser to a relay circuit, whereby the time of discharge of the said timing condenser, previously charged to a controllable source of potential is made a desired function of the amount of radiation impressed upon the said phototube by means of the application of said conductive foil to the exterior of said phototube, whereby said apparatus is adapted to have the said variable potential which is applied to the said foil, simultaneously impressed upon the suppressor grid of the input stage of the said electronic amplifier in order to increase the effectiveness of the first specified arrangement, thus achieving the desired end-result by means of lower voltage impressed upon the said foil than those that would be required without the said suppressor-grid connection.

9. The process of altering the spectral color response of a photo-responsive system incorporating a single cathode, which comprises applying an electric potential to the vitreous envelope of said system causing photoresponsive emission from the vitreous interior surface of the envelope of the said system, said emission having different spectral properties from those produced by the said cathode and combining said emissions, whereby a general shift of color response of the said system is produced.

ANTON MARTIN FELLER.

References Cited in the file of this patent

UNITED STATES PATENTS

| Number | Name | Date |
|---|---|---|
| 1,645,280 | Goldsborough et al. | Oct. 11, 1927 |
| 1,863,052 | Hund | June 14, 1932 |
| 1,939,243 | Twyman | Dec. 12, 1933 |
| 1,991,477 | Urie | Feb. 19, 1935 |
| 2,177,259 | Keck | Oct. 24, 1939 |
| 2,193,953 | Walton | Mar. 19, 1940 |
| 2,339,053 | Coleman | Jan. 11, 1944 |
| 2,438,303 | Simmon | Mar. 23, 1948 |
| 2,463,985 | Linde | Mar. 8, 1949 |
| 2,469,076 | Rabinowitz | May 3, 1949 |